United States Patent
Ito et al.

(10) Patent No.: US 6,578,934 B2
(45) Date of Patent: Jun. 17, 2003

(54) SNOW REMOVAL MACHINE

(75) Inventors: Tomoki Ito, Wako (JP); Takahiro Yamamoto, Wako (JP); Norikazu Shimizu, Wako (JP); Masakatsu Kono, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/903,789

(22) Filed: Jul. 12, 2001

(65) Prior Publication Data

US 2002/0005665 A1 Jan. 17, 2002

(30) Foreign Application Priority Data

Jul. 17, 2000 (JP) ........................................ 2000-216311

(51) Int. Cl.[7] .............................. B60B 19/02; B60S 1/62; B60S 1/68; B62D 25/16
(52) U.S. Cl. ........................ 305/110; 305/107; 280/855
(58) Field of Search ................................. 305/110, 100, 305/107, 111, 109; 280/855; 172/610; 404/129

(56) References Cited

U.S. PATENT DOCUMENTS

| | | | | |
|---|---|---|---|---|
| 2,560,307 A | * | 7/1951 | Slemmons | 305/110 |
| 4,198,103 A | * | 4/1980 | Ward et al. | 305/110 |
| 4,531,787 A | * | 7/1985 | Hart et al. | 280/855 |
| 4,830,439 A | * | 5/1989 | Collins et al. | 305/110 |
| 5,697,683 A | * | 12/1997 | Arulandu et al. | 305/107 |
| 5,725,292 A | * | 3/1998 | Keedy et al. | 305/107 |
| 5,775,447 A | * | 7/1998 | Dester et al. | 305/110 |
| 5,820,230 A | * | 10/1998 | Freeman | 305/107 |

FOREIGN PATENT DOCUMENTS

JP    06060482    5/1987

* cited by examiner

Primary Examiner—S. Joseph Morano
Assistant Examiner—Jason R. Bellinger
(74) Attorney, Agent, or Firm—Adams & Wilks

(57) ABSTRACT

A snow removal machine propelled by crawler belts trained around drive wheels and driven wheels is provided. The snow removal machine has a scraper confronting the outer periphery of the driven wheel so as to remove snow adhering to and accumulating on the outer periphery during snow removing operation. It prevents increase in tension of the crawler belt due to the increased diameter of the driven wheel in appearance that might otherwise be caused by snow adhering to the outer periphery.

21 Claims, 6 Drawing Sheets

FIG.6A
(COMPARATIVE EXAMPLE)

FIG.6B
(EMBODIMENT)

SNOW REMOVAL MACHINE

BACKGROUND OF THE INVENTION

1. Field of the Invention

The present invention relates to an improvement in a snow removal machine propelled by crawler belts.

2. Description of the Related Art

In removing snow, snow removal machines are generally used for lessening the labor. A snow removal machine has a snow removing implement such as a rotary snow removing device or a snow removing plate at a front part of its body and is propelled by crawler belts during snow removal. This type of snow removal machine is disclosed in, for example, Japanese Patent Publication No. HEI-6-60482. The snow removal machine has drive wheels at a front part of its body and driven wheels at a rear part of its body. Crawler belts are trained around the drive wheels and driven wheels for serving as running parts.

In this snow removal machine, since the crawler belts have openings between the drive wheels and the driven wheels, snow may get into the inside of the crawler belts from sideways during snow removing operation. Some of the snow getting into the inside of the crawler belts may be conveyed toward the driven wheels by the crawler belts, adhere to the outer peripheries of the driven wheels and accumulate thereon. This phenomenon is conspicuous when the snow is fresh and powdery.

Snow accumulated on the outer peripheries of the driven wheels increases the apparent outer diameter of the driven wheels, increasing the tension of the crawler belts. Propelling the snow removal machine by the crawler belts under the increased tension shortens the lives of the belts. In order to maintain a normal stretch of the crawler belts, it is necessary to remove snow accumulated on the outer peripheries of the driven wheels manually. This deteriorates efficiency in snow removing operation.

It is further conceived that different amounts of snow may adhere to the right and left drive wheels and driven wheels. For example, if more snow accumulates on the left drive wheel or driven wheel, the outer diameter of the left drive wheel or driven wheel increases in appearance, whereby the snow removal machine is gradually turned to the right, losing straight advance.

SUMMARY OF THE INVENTION

It is therefore an object of the present invention to provide a snow removing machine which is designed to effectively remove snow adhered to and accumulated on an outer periphery of a drive wheel or driven wheel.

According to an aspect of the present invention, there is provided a snow removal machine comprising a body, a drive wheel and a driven wheel mounted to the body, a crawler belt wound around the drive wheel and driven wheel, and a scraper opposed to the outer periphery of the driven wheel to remove snow accumulated on the outer periphery.

With the scraper, snow adhered to and accumulated on the outer periphery of the driven wheel can be removed to prevent increase in tension of the crawler belt due to the increased diameter in appearance of the driven wheel that might otherwise be caused by snow accumulating on the outer periphery. This prolongs the life of the crawler belt substantially. Removal of snow with the scraper eliminates the need for manual snow removal, thereby improving workability. No difference arises in the amounts of snow adhering to the right and left driven wheels, thereby ensuring linear travel of the snow removal machine.

It is preferred that the scraper comprise blades at upper and lower ends of a surface thereof confronting the outer periphery, and a concave part at the middle part to distance the middle part from the outer periphery so as to prevent snow left on the outer periphery from making contact with the concave part, thereby preventing breakage of the scraper.

In a preferred form, the scraper is bent at a substantially right angle to have a substantially L shape section, and has a mounting plate to be mounted to a lower cover provided on axes of the drive wheel and driven wheel, and a scraping member confronting the outer periphery of the driven wheel. The scraping member has a curved shape with a radius of curvature smaller than a radius of curvature of the outer periphery of the driven wheel, to form the concave part.

It is preferred to integrally form a reinforcing member protruding from the middle part of a bend between the mounting plate and scraping member so as to prevent the scraping member from deforming from the bend under snow scraping load. Further, the integral molding of the reinforcing member can reduce the number of parts.

The scraper is adjustable to be made close to or distanced from the outer periphery of the driven wheel and can be arranged in a preferred position relative to the outer periphery.

Another scraper opposed to the outer periphery of the drive wheel to remove snow accumulating on the outer periphery can scrape snow adhering to and accumulating on the outer periphery of the drive wheel.

BRIEF DESCRIPTION OF THE DRAWINGS

A preferred embodiments of the present invention will be described in detail below, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
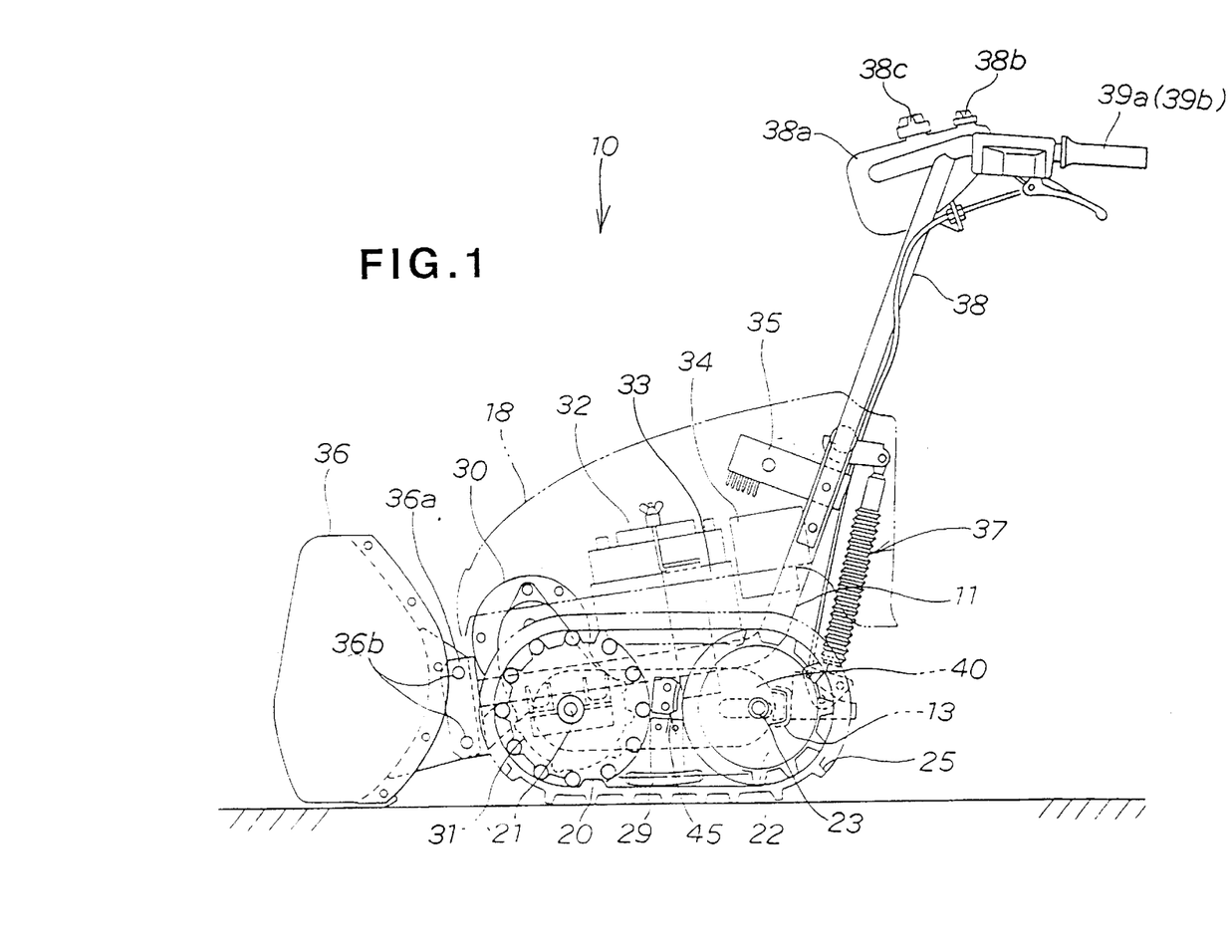
FIG. 1 is a side view of a snow removal machine according to the present invention.

Referring to FIG. 1, a snow removal machine 10 has a body (body frame) 11 formed in substantially L shape as viewed in side elevation. A pair of right and left drive wheels 20, 20 and driven wheels 22, 22 (shown are only the left-side ones in the forward direction of the snow removal machine) are provided on the right and left sides of the body frame 11. Crawler belts 25, 25 are wound around the drive wheels 20, 20 and the driven wheels 22, 22, respectively (shown is only the left side one in the forward direction of the snow removal machine). An electric motor 30 and a power transmission mechanism 31 for driving the drive wheels 20, 20 are mounted to the front part of the body frame 11. A battery 32 is arranged rearward of the electric motor 30 and the power transmission mechanism 31. A charger 34 and a control device 35 are arranged rearward of the battery 32. A snow removing implement in the form of a snow removing plate 36 for pushing out snow is provided at the front end of the body frame 11. A height adjustment mechanism 37 for adjusting the height of the snow removing plate 36 is arranged rearward of the body frame 11. An operating handle 38 is mounted to a rear upper part of the body frame 11. An operation box 38a is mounted on an upper part of the operating handle 38. The operating handle 38 has right and left grips 39a, 39b at the rear ends thereof.

A cover 18 mounted on the body frame 11 covers the electric motor 30, power transmission mechanism 31, battery 32, charger 34, and control device 35.

The battery 32 is a power source for supplying electric power to the electric motor 30 and is mounted on an upper part of the body frame 11 via a battery housing box 33.

The charger 34 charges the battery 32 with a plug (not shown) inserted into an AC power receptacle of a home power source or the like. The charger 34 is arranged rearward of the battery housing box 33 and mounted on the body frame 11.

The control device 35 controls the electric motor 30 based on signals from a forward/backward switch and a potentiometer (not shown) mounted on an upper part of the operating handle 38, a main switch 38b of the operation box 38a, and a maximum speed setting switch 38c. The control device 35 is arranged above the charger 34 and mounted to the body frame 11.

The snow removing plate 36 is attached to a mounting bracket 36a mounted to the front of the body frame 11 via pins 36b, 36b.

In the snow removal machine 10, the electric motor 30 is driven to transmit drive power of the electric motor 30 to the right and left drive wheels 20, 20 via the power transmission mechanism 31, to rotate the right and left drive wheels 20, 20, thereby to rotate the crawler belts 25 for self propelling.

The operator holds the right and left grips 39a, 39b of the operating handle 38, walking at a speed proportionate to that of the running snow removal machine 10, to control the forward direction or the height of the snow removing plate 36 with the operating handle 38.

Figure 2:
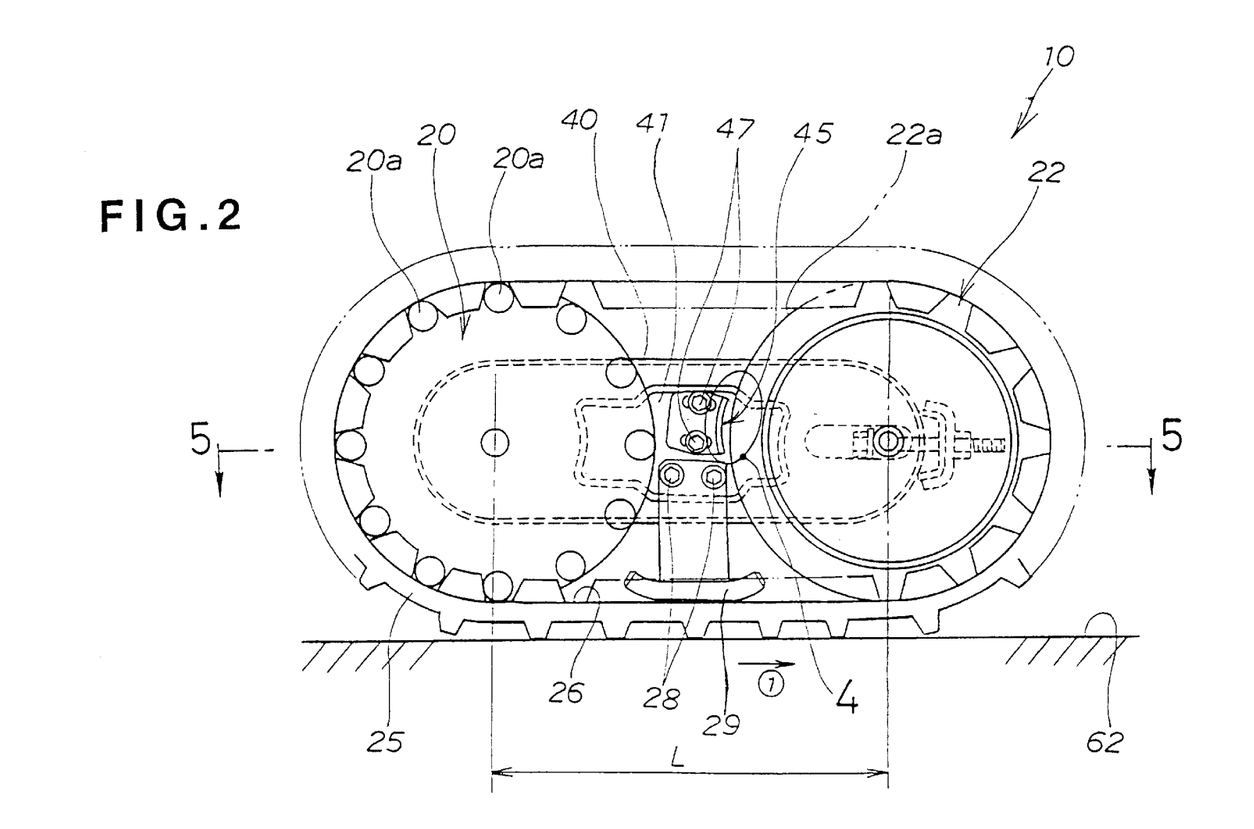
FIG. 2 is an enlarged side view of a running part as shown in FIG. 1.
Figure 3:
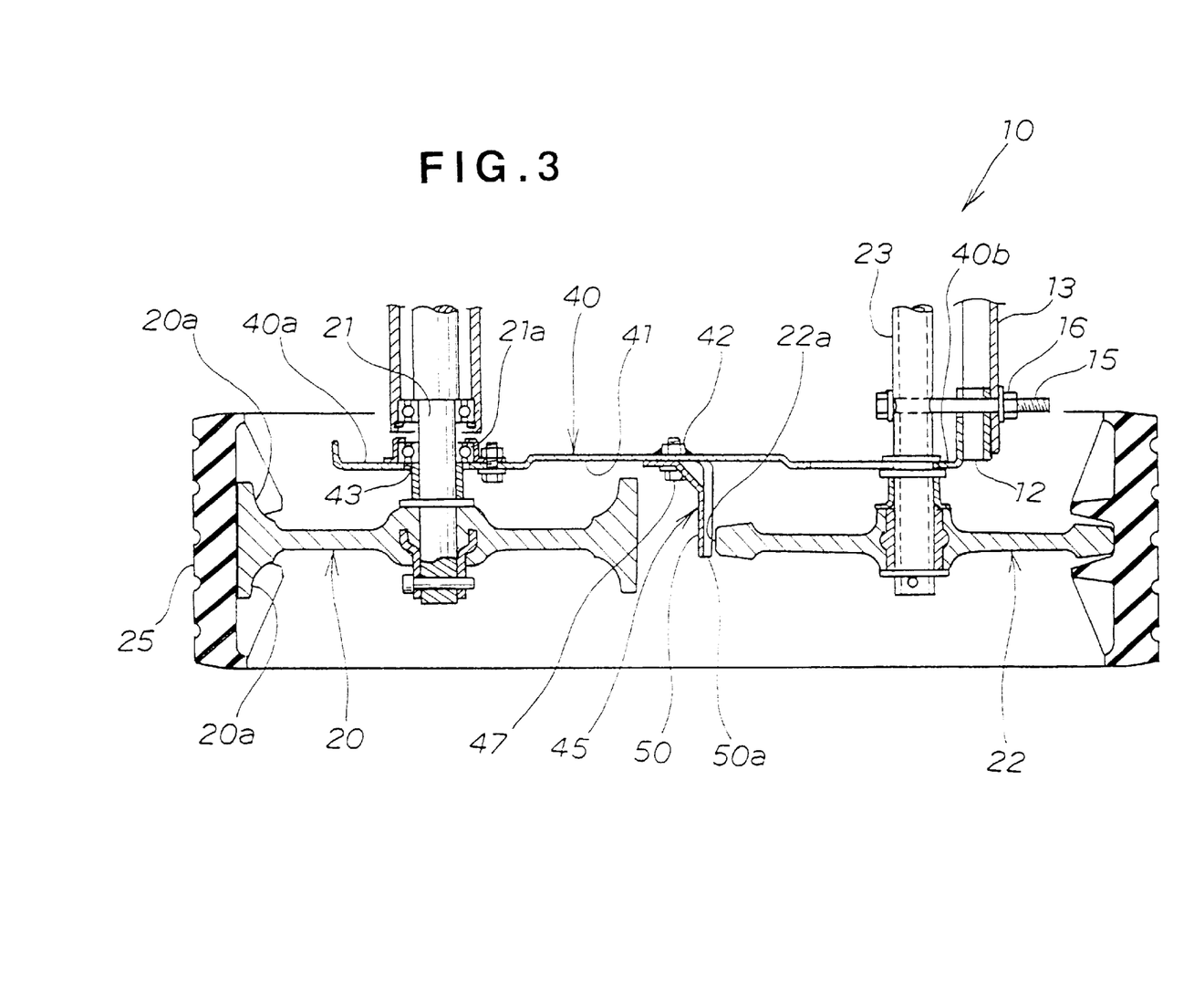
FIG. 3 is a perspective view showing a relationship between a scraper as an essential part of the present invention and a driven wheel.

Referring to FIGS. 2 and 3, a lower cover 40 in a substantially elliptic shape serving as a running frame is arranged on the inner side of the drive wheel 20 and driven wheel 22, that is on the side of the body frame 11 (See FIG. 1). The lower cover 40 has a recess 41 formed in the middle part. On the inner side of the concave part 41 welding nuts 42 are attached, into which nuts 42, bolts 47, 47 are screwed to mount a scraper 45 to the lower cover 40. At that time, a front end 50a of a scraping member 50 constituting the scraper 45 is made to face the outer periphery of the driven wheel 22.

A front part 40a of the lower cover 40 has a hole 43 through which a drive shaft 21 is inserted to mount the front part 40a to the drive shaft 21 via bearings 21a. A rear part 40b of the lower cover 40 is mounted to a cross member 13 via a bracket 12. Specifically, an adjustment bolt 15 is inserted through a driven shaft 23, the bracket 12 and the cross member 13, and a nut 16 is fastened to the adjustment bolt for mounting.

Below the scraper 45, a member 29 for preventing the lifting of the crawler belt 25 is mounted via bolts 28, 28.

Now the reason why the scraper 45 is made to face the outer periphery 22a of the driven wheel 22 will be described.

When snow removing is performed with the snow removal machine 10 as shown in FIG. 1, snow is removed by the snow removing plate 36 while the machine 10 is advanced. At that time, the drive wheel 20 is driven to rotate the crawler belt 25 that is engaged with a plurality of drive pins 20a provided on the drive wheel 20.

The range L of contact of the crawler belt 25 with a road surface 62 is shifted in the direction of an arrow ①. When snow gets into the inner periphery 26 of the crawler belt 25 within the range L, the snow is conveyed on the inner periphery 26 of the crawler belt 25 to the driven wheel 22 side and adheres to the outer periphery 22a of the driven wheel 22.

Figure 4:
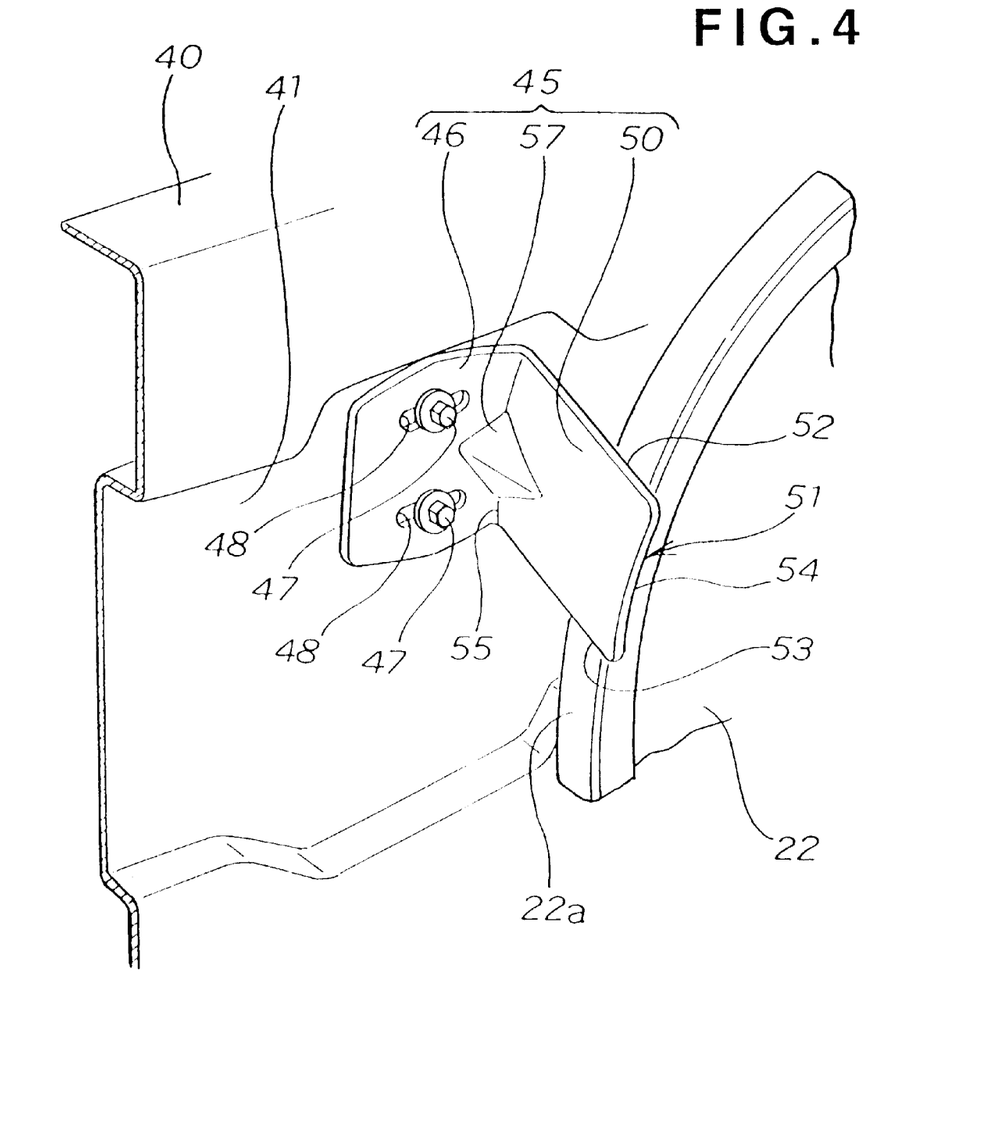
FIG. 4 is an enlarged view of an essential part as shown in FIG. 2.

Referring to FIG. 4, the scraper 45 consists of a mounting plate 46, scraping member 50 and reinforcing member 57. The scraper 45 is bent in substantially L shape to form a right angle between the mounting plate 46 mounted to the lower cover 40 and the scraping member 50 opposed to the outer periphery 22a of the driven wheel 22, and has the reinforcing member 57 protruding at the middle part of a bend 55.

The mounting plate 46 has a pair of upper and lower elongated holes 48, 48 for adjusting the position of the scraper 45. The mounting plate 46 is mounted to a wall constituting the recess 41 of the lower cover 40 through the elongated holes 48, 48, fastened with the bolts 47, 47. The elongated holes 48, 48 allow adjusting the position of the scraper 46 in the longitudinal direction of the lower cover 40 by loosening the bolts 47, 47, thereby to arrange the scraper in a preferable position.

The scraping member 50 faces the outer periphery 22a of the driven wheel 22 to remove snow accumulating on the outer periphery 22a of the driven wheel 22. The scraping member 50 is exemplarily formed in a curved or arcuate shape with a radius of curvature smaller than that of the driven wheel. A surface 51 opposed to the outer periphery 22a of the driven wheel 22 is resultantly in a curved shape. Both ends of the surface 51 (upper and lower ends) constitute blades 52, 53. The middle part or central portion of the surface 51 constitutes a concave part 54 to be spaced from the outer periphery 22a of the driven wheel 22.

The reinforcing member 57 serves to prevent the scraping member 50 from deforming from the bend 55 when removing snow accumulating on the outer periphery 22a of the driven wheel 22. The reinforcing member 57 is integrally molded with the mounting plate 46 and scraping member 50, which reduces the number of parts, facilitating the assembly.

Figure 5:
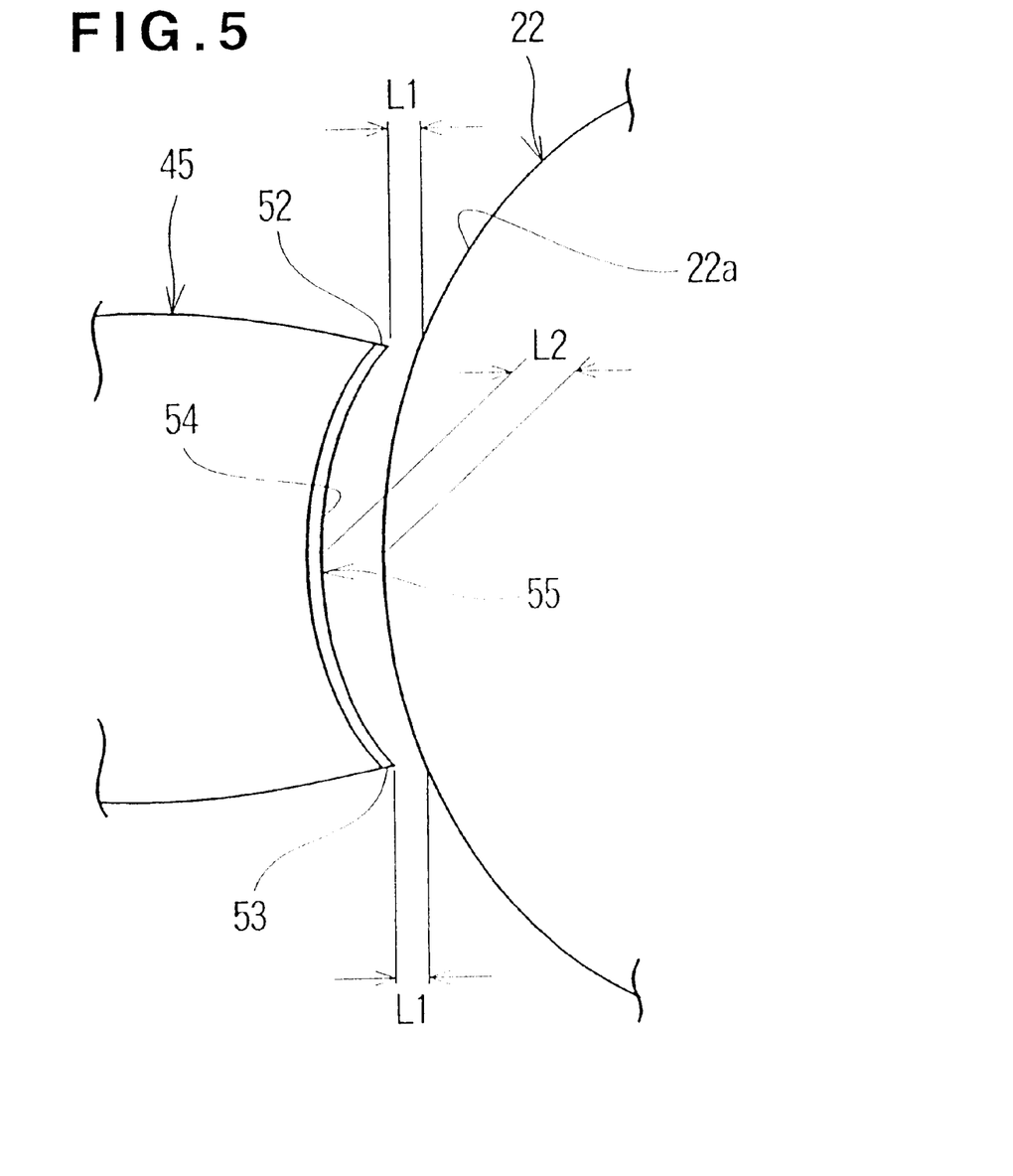
FIG. 5 is a sectional view taken along line 5—5 as shown in FIG. 2.

Referring to FIG. 5, it is required to make the scraper 45 closer at the upper and lower blades 52, 53 to the outer periphery 22a of the driven wheel 22 so as to efficiently remove snow accumulating on the outer periphery 22a of the driven wheel 22. Thus it is preferred to set space L1 between the upper and lower blades 52, 53 and the outer periphery 22a of the driven wheel 22 as small as possible.

On the other hand, it is required to distance the scraper 45 at the concave part 54 from the outer periphery 22a of the driven wheel 22 so as to prevent the concave part 54 from making contact with snow left on the outer periphery 22a of the driven wheel 22. Thus it is preferred to set space L2 between the concave part 54 and the outer periphery 22a of the driven wheel 22 larger.

Figure 6A:
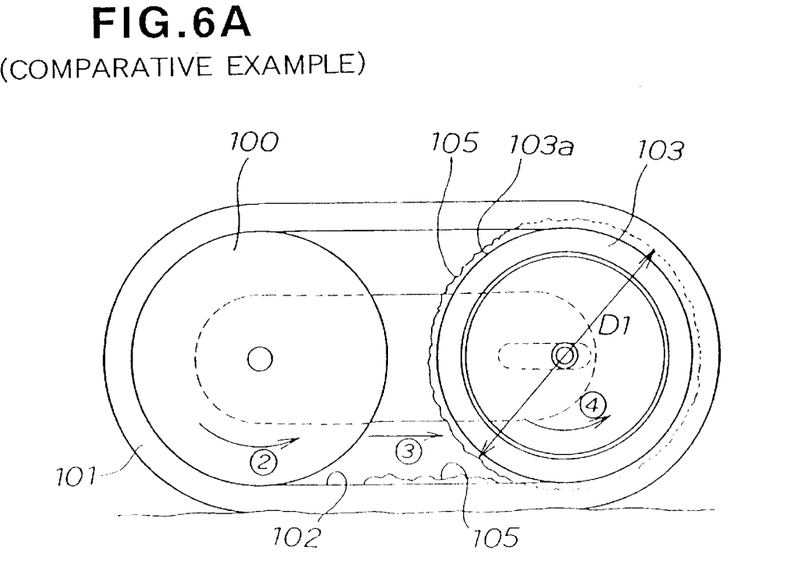
FIG. 6A and FIG. 6B show a comparative example and an operation diagram of an embodiment of the present invention.
Figure 6B:
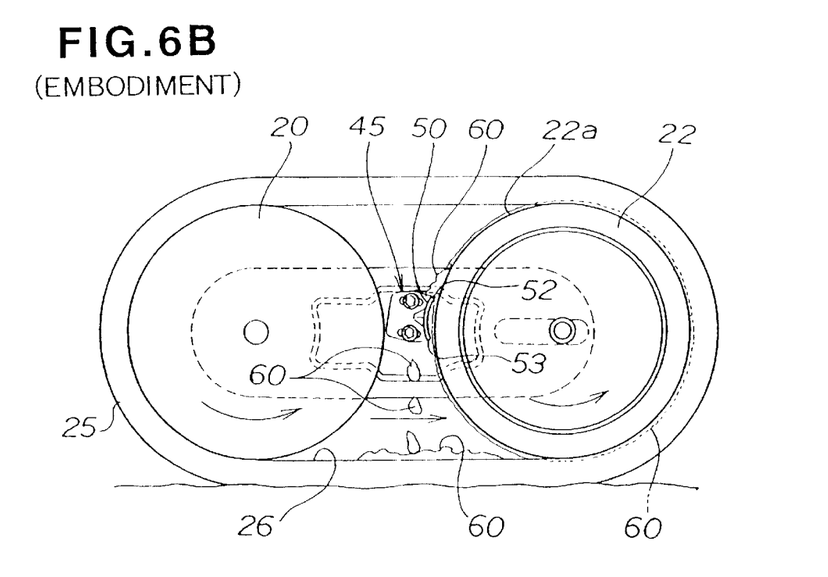

Now the function of the snow removal machine 10 according to the present invention will be described by comparing the comparative example as shown in FIG. 6A with the present embodiment as shown in FIG. 6B.

In FIG. 6A, to advance the snow removal machine, a drive wheel 100 is rotated in the direction of an arrow ② to rotate a crawler belt 101 in the direction an arrow ③ and to rotate a driven wheel 103 in the direction of an arrow ④.

Snow 105 getting into the inner periphery 102 of the crawler belt 101 is conveyed to the direction of the driven wheel 103, being on the inner periphery 102 of the crawler belt 101. The snow 105 conveyed adheres to and accumulates on the outer periphery 103a of the driven wheel 103.

The snow 105 accumulating on the outer periphery 103a of the driven wheel 103 increases in appearance the outer diameter D1 of the driven wheel 103 to stretch the crawler belt. Running in this state may shorten the life of the crawler belt 101. To maintain a normal stretch of the crawler belt 101, it is necessary to remove the snow 105 accumulating on the outer periphery 103a of the driven wheel 103 on a frequent basis, preventing improving snow removing workability. It is further conceivable that different amounts of snow 105 adhere to the right and left drive wheels 100 or driven wheels 103 (only left-side ones are shown). For example, if more snow 105 accumulates on the left drive wheel 100 or driven wheel 103, the snow removal machine will gradually turn to the right. This adversely affects the straight advancement of the snow removal machine, and requires compensating the adverse affect by operating the operating handle, increasing load of the operator.

In FIG. 6B, in advancing the snow removal machine of this embodiment, if snow 60 gets into the inner periphery 26 of the crawler belt 25, the snow 60 is conveyed in the direction of the driven wheel 22 as shown in an arrow, being on the inner periphery 26 of the crawler belt 25. The snow 60 conveyed adheres to and accumulates on the outer periphery 22a of the driven wheel 22.

In this embodiment, however, the scraping member 50 of the scraper 45 is opposed to the outer periphery 22a of the driven wheel 22, so that the snow 60 accumulating on the outer periphery 22a of the driven wheel 22 is removed by the upper blade 52 of the scraping member 50. Thus, the accumulation of the snow 60 on the outer periphery 22a of the driven wheel 22 is avoided to prevent the crawler belt 25 from increasing its tension. Thus it is possible to use the crawler belt 25 in a normal state, which ensures sufficiently long life of the crawler belt 25. No further operation to remove the snow 60 accumulating on the outer periphery 22a of the driven wheel 22 is required, which increases workability in removing snow.

In setting the snow remove machine backward, the drive wheel 20, crawler belt 25, and driven wheel 22 are rotated in the opposite direction to the rotational direction in advancement. At that time, the lower blade 53 of the scraper 45 removes the snow 60 accumulating on the outer periphery 22a of the driven wheel 22.

The above embodiment shows an example in which the scraper 45 faces the driven wheel 22. It is also possible to provide another scraper 45 facing the drive wheel 20.

Further, the above embodiment shows an example in which the scraper 45 has the scraping member 50 formed in a substantially curved shape. It is also possible to make it in another shape. The point is that the blades 52 and 53 be closer to the outer periphery 22a of the driven wheel 22 and the concave part 54 distanced from the outer periphery 22a. For example, a rectangular C shape is applicable. It is also possible to make the scraping member 50 have only the upper blade 52.

In the above-described embodiment, the snow removal machine 10 has the snow removing plate 36 as the snow removing implement. It is also possible to apply the present invention to a snow removal machine having another type of snow removing implement, such as a rotary snow removing device, to provide similar effects.

Obviously, various minor changes and modifications of the present invention are possible in the light of the above teaching. It is therefore to be understood that within the scope of the appended claims, the invention may be practiced otherwise than as specifically described.

What is claimed is:

1. A snow removal machine comprising:

a body;

a drive wheel and a driven wheel mounted to the body;

a crawler belt trained around the drive wheel and driven wheel; and a scraper opposed to an outer periphery of the driven wheel to remove snow accumulated at least on the outer periphery of the driven wheel, the scraper being bent at a substantially right angle to have a substantially L shape section, and the scraper having a mounting plate to be mounted to a lower cover provided on axes of the drive wheel and driven wheel, and a scraping member facing the outer periphery of the driven wheel, and the scraping member having a radius of curvature smaller than a radius of curvature of the outer periphery of the driven wheel.

2. A snow removal machine comprising:

a body;

a drive wheel and a driven wheel mounted to the body;

a crawler belt trained around the drive wheel and driven wheel; and a scraper opposed to an outer periphery of the driven wheel to remove snow accumulated at least on the outer periphery of the driven wheel, the scraper being bent at a substantially right angle to have a substantially L shape section, and the scraper having a mounting plate to be mounted to a lower cover provided on axes of the drive wheel and driven wheel, a scraping member facing the outer periphery of the driven wheel, and a reinforcing member protruded from and integrally formed with a middle part of a bend between the mounting plate and the scraping member.

3. A snow removal machine comprising:

a body;

a drive wheel and a driven wheel mounted to the body;

a crawler belt trained around the drive wheel and driven wheel; and a scraper opposed to an outer periphery of the driven wheel to remove snow accumulated at least on the outer periphery of the driven wheel, the scraper being adjustable to be made close to or distanced from the outer periphery of the driven wheel.

4. A snow removal machine comprising:

a body;

a drive wheel and a driven wheel mounted to the body;

a crawler belt trained around the drive wheel and driven wheel; and a scraper opposed to an outer periphery of the driven wheel to remove snow accumulated at least on the outer periphery of the driven wheel, the scraper having a surface confronting the outer periphery of the driven wheel with a space defined therebetween, the surface of the scraper having an upper end, a lower end and a central portion disposed between the upper and lower ends, the space between the surface of the scraper and the outer periphery of the driven wheel being non-uniform and larger at the central portion than at the upper and lower ends of the surface of the scraper.

5. A snow removal machine according to claim 4; wherein the space between the surface of the scraper and the outer periphery of the driven wheel increases gradually in a direction from the upper or the lower end toward the central portion of the surface of the scraper.

6. A snow removal machine according to claim 5; wherein the surface of the scraper is curved.

7. A snow removal machine according to claim 5; wherein the surface of the scraper is arcuate and has a radius of curvature smaller than that of the outer periphery of the driven wheel.

8. A snow removal machine according to claim 4; wherein the scraper is bent at a substantially right angle to have a substantially L shape section, and the scraper has a mounting plate to be mounted to a lower cover provided on axes of the drive wheel and driven wheel, and a scraping member formed integrally with the mounting plate and having the surface confronting the outer periphery of the driven wheel.

9. A snow removal machine according to claim 8; wherein the scraper has a reinforcing member protruded from and integrally formed with a middle part of a bend between the mounting plate and the scraping member.

10. A snow removal machine according to claim 4; wherein the scraper is adjustable to be made close to or distanced from the outer periphery of the driven wheel.

11. A snow removal machine comprising: a body having a snow removing implement at a front end thereof; at least one drive wheel and at least one driven wheel rotatably mounted to the body; a crawler belt entrained around the drive wheel and driven wheel; and a scraping member spaced from and confronting an outer periphery of the driven wheel, the scraping member having an upper portion terminating in an upper blade for removing snow accumulated at least on the outer periphery of the driven wheel and a central portion connected to the upper portion, the upper blade being positioned closer to the outer periphery of the driven wheel than the central portion.

12. A snow removal machine according to claim 11; wherein the scraping member is adjustably positionable to enable adjustment of the distance between the upper blade and the outer periphery of the driven wheel.

13. A snow removal machine according to claim 11; wherein the scraping member has an arcuate shape.

14. A snow removal machine according to claim 11; wherein the scraping member has a lower portion terminating in a lower blade, the lower portion being connected to the central portion with the lower blade positioned closer to the outer periphery of the driven wheel than the central portion.

15. A snow removal machine according to claim 14; wherein the scraping member is adjustably positionable to enable adjustment of the distance between the upper and lower blades and the outer periphery of the driven wheel.

16. A snow removal machine according to claim 14; wherein the scraping member has an arcuate shape.

17. A snow removal machine according to claim 14; wherein the scraping member comprises part of a scraper having a mounting plate for mounting the scraper to the snow removal machine, the scraping member being connected to and projecting outwardly from the mounting plate.

18. A snow removal machine according to claim 17; wherein the scraper includes a reinforcing member interconnecting the mounting plate and the scraping member.

19. A snow removal machine according to claim 17; wherein the mounting plate is adjustably mounted to enable adjustment of the scraper to thereby adjust the distance between the upper and lower blades and the outer periphery of the driven wheel.

20. A snow removal machine according to claim 11; wherein the scraping member comprises part of a scraper having a mounting plate for mounting the scraper to the snow removal machine, the scraping member being connected to and projecting outwardly from the mounting plate.

21. A snow removal machine according to claim 20; wherein the mounting plate is adjustably mounted to enable adjustment of the scraper to thereby adjust the distance between the upper blade and the outer periphery of the driven wheel.

* * * * *